United States Patent Office 3,546,004
Patented Dec. 8, 1970

1

3,546,004

METHOD OF PRODUCING WATER VAPOR AND AIR PERMEABLE FILMS OF POLYMERIC MATERIAL

Theodor Schachowskoy and Jürgen Knoke, Weinheim an der Bergstrasse, Germany, assignors to Carl Freudenberg, Weinheim an der Bergstrasse, Germany, a German corporation No Drawing. Filed Feb. 24, 1966, Ser. No. 540,780
Claims priority, application Germany, Mar. 9, 1965, F 45,455
Int. Cl. B44d *1/08;* D06n *3/14*
U.S. Cl. 117—104 11 Claims

ABSTRACT OF THE DISCLOSURE

Process of producing water vapor and air permeable films of a polymeric material particularly suitable for use as synthetic leather including dissolving a polymer having a torsion modulus of at least 30 kg./sq. cm. in a solvent for such polymer, adding to the solution a coagulant for such polymer from such solution wherein the solvent and the coagulant are suitably miscible with each other and wherein the proportion of coagulant added to the solution is from about one half to less than the amount necessary to cause coagulation of said polymer from said solution, and depositing such admixture into a suitable substrate under such conditions that a portion of the solvent evaporates preferentially with respect to said coagulant during such deposition whereby causing said polymer to coagulate from said mixture onto said substrate.

This invention relates to the production of permeable films. It more particularly refers to the production of relatively thick films coated onto a suitable substrate which are permeable to air and water vapor.

For many years it has been sought to manufacture an artificial or synthetic leather. Among the many materials which have been tried and used with greater or lesser degree of success, polyvinyl chloride has probably received more attention than any other. For example, polyvinyl chloride foam coated on a fabric base support material has been used as an artificial leather for a long time.

Polyvinyl chloride, even plasticized and even in foam form, is however, not permeable to air and water vapor to an extent necessary to permit the product to "breathe." As is known, one of the outstanding properties of leather, in addition to flexibility and sturdiness, is its ability to pass water vapor and air. Thus, shoe uppers have, for the most part until the past few years, been manufactured almost entirely from real leather rather than any of the substituents which have been attempted to be marketed.

During the past few years, products have been described as artificial leather which would appear to have solved this permeability problem in that they are capable of passing water vapor and air and yet are flexible and durable enough to actually replace leather with little or no loss in properties in shoe uppers. These products generally consist of a batt of nonwoven fibers having a microporous binder therein and a smooth microporous top coating of high permeability thereon.

The methods of producing such moisture and air permeable films or coatings have been rather cumbersome and difficult to practice repeatedly with precision. Several of the known methods of producing such films or coatings are described below.

In French Pat. No. 1,298,959, there is described a method whereby a polymer (supposedly suitable for a film having the desired properties described above) is dis-

2 solved in a mixture of a high and a low boiling material and the solution sprayed via an air stream under pressure to produce fibers by the spraying and to lay down a "film" of these fibers which is very air and water vapor permeable. The fibrous "film" is laid down by spraying in alternating perpendicular directions. Since the fibers thus produced have a short dimension of about 3 to 10 microns and a long dimension of about 200 to 2500 microns, the "film" is essentially a finely porous "fabric" having irregularly shaped channels therethrough. Such a "film" or "fabric" was intended to be itself a leather substitute and was not intended to be applied as a coating to any substrate.

It has been found however that such "films" made from various polymers are not sufficiently strong to be used instead of leather for shoe uppers and that therefor it instead of leather for shoe uppers and that therefore it this "film" can be coated. Such a suitable substrate would be a needled, impregnated, non-woven fibrous batting or a woven fabric. It is necessary in the use of such substrate that the permeable coating adhere thereto and that it also retain its permeability after adherence. Unfortunately, in order to obtain proper adherence to the substrate, the coating "film" must be wet. Yet the "film" is only sufficiently air and water vapor permeable if it is substantially dry. Therefore it is apparent that the coating film thus described is not suited to the artificial leather market where a substrate is to be used.

Another proposal for the obtaining of coatings which are permeable to air and water vapor contemplates dissolving a high polymer, such as polychloroprene, butadienestyrene, chlorosulfonated polyethylene copolymer, butadiene-acrylonitrile copolymer or vinylidene fluoridehexafluoropropene copolymer, in a mixture of a ketone and an aliphatic hydrocarbon (U.S. Pat. No. 3,109,750). Each solvent should have a different vapor pressure and each should alone be a nonsolvent for the polymer; only the mixture of the two being capable of dissolving the polymer. By preferred evaporation of one component, the polymer coagulates to form a microporous layer when coated onto a support material. It has been determined that in a layer having a thickness of about 150 to 200$\mu$ using unpigmented solutions, a water permeability of greater than 1 mg./cm.$^2$/hr. could not be obtained. Permeability was measured by the method of Mitton.

In another attempt to produce a suitably porous leather substitute, a solution of a cellulose derivative or of a vinyl compound in a readily volatile solvent, for instance, acetone, and a somewhat more difficultly volatile precipitant, such as toluene or alcohol, is applied, whereby a cloudy film of individually precipitated polymer particles is to be produced. With elastomers, such as polychloroprene, butadiene copolymers, polyurethanes, etc., microporous layers of more than 0.1 mm. which were permeable to water vapor could not be synthesized in this manner; in each case, a nonporous film was produced.

A solution of a polyurethane polyvinyl chloride mixture or a carboxylated butadiene-acrylonitrile copolymer, respectively, in dimethyl formamide has been described. In one specification, the solution of either one of these polymers was described as nearly saturated with water. In the second specification, the addition of water was continued beyond the point of precipitation. Both of the substances were applied to a substrate and then coagulated by immersion in cold water. Microporous coating materials having very good properties were produced, but these methods are rather cumbersome due to the required washing and resultant drying and the necessity of recovering the high-boiling solvent dimethyl formamide. With a low-boiling solvent, such as tetrahydrofuran or dioxane, no microporous products were obtained in tests carried out by this method. This was even less successful when immersion in the precipitating bath was dispensed with and the water-saturated polymer solution in tetrahydrofuran was allowed to evaporate in the air, whereby the tetrahydrofuran would be expected to evaporate first and it would be expected that the polymer would coagulate to produce the desired microporous coating. Unfortunately, a transparent, nonpermeable film was obtained by practicing this method.

Thus it can be seen that it has not as yet been possible to produce relatively thick coatings upon substrates which are air and water vapor permeable, have good bending properties and are sufficiently rugged to be used in the fabrication of shoe uppers. Such material should be finely porous in thicknesses greater than about 200 microns and should be produced from elastomers or at least be reasonably elastic after deposition as a film or coating.

It is therefor an object of this invention to provide a relatively thick material which in film form is permeable to air and to water vapor and relatively imperameable to liquid water.

It is another object of this invention to produce such film from an elastomeric material.

It is a further object of this invention to provide such a film coated upon a fibrous substrate.

It is still another object to provide a relatively simple method of producing a composite article comprising a fibrous substrate and a water vapor-air permeable coating thereon.

It is still a further object of this invention to provide a method of producing a leather substitute material which is permeable to air and water vapor, but is relatively unpermeable to liquid water.

Other and additional objects of this invention will become apparent from a consideration of the entire specification including the appended claims.

In accord with and fulfilling these objects, one aspect of this invention comprises a process for the production of a film of a material which is permeable to air and water vapor and which is suited to use as a leather substitute. This process comprises dissolving a high polymeric material having a torsion modulus (DIN 53445) of greater than about 30 kg./sq. cm. in a solvent having a low boiling point; adding to such solution a polar nonsolvent for said polymer which is miscible with the solvent and has the property of not effecting the polymer solubility in the total vehicle below a certain concentration, but acting as a coagulating agent at or above such concentration which nonsolvent has a higher boiling point than said solvent; and spraying said solution onto a suitable substrate.

As noted, polymers which have a torsion modulus greater than 30 kg./sq. cm. have been found to be suited to use in this invention. It is preferred to use polymers having a torsion modulus of greater than 40 kg./sq. cm. Exemplary of such polymers are polyurethanes, polymers and copolymers of methacrylic and acrylic esters, and halogenated sulfonated polyolefins, preferably chlorosulfonated polyethylene. It is preferred to use polyurethanes prepared by the polymerization reaction of aliphatic or aromatic polyisocyanates or isothiocyanates with active hydrogen-containing compounds such as polyesters, polyester amides, polyethers and/or mixtures of any of these. Tolylene diisocyanates, diphenyl methane diisocyanate and 1,6-hexane diisocyanate are exemplary of useful polyisocyantes. Examples of active hydrogren-containing materials include polyethylene glycol, polypropylene glycol, ethylene oxide-propylene oxide copolymer, 1,4-butanediol-adipic acid polyester, polytetramethylene glycol.

Exemplary acrylic type polymers include copolymers of ethyl acrylate-acrylonitrile-methacrylic acid.

The spraying medium or vehicle is necessarily a solvent for the chosen polymer and is miscible with the "nonsolvent" material. Suitably these two materials have relatively widely differing boiling points or at least widely differing vapor pressures at the temperature at which spraying is accomplished. Thus, the solvent should have a lower boiling point and/or preferably a higher vapor pressure at the spraying temperature than does the non-solvent. The system, solvent-nonsolvent, is so chosen that the polymer to be used is soluble in the system, but that a slight increase in the concentration of the nonsolvent in the system will cause coagulation of the polymer. For example, an uncross-linked polyurethane having a torsion modulus of about 40 kg./sq. cm. is soluble in tetrahydrofuran even with a water content of up to about 22 weight percent, based upon the total weight of tetrahydrofuran. Upon spraying such a solution at about room temperature, some small quantity of the tetrahydrofuran evaporates thereby raising the water concentration to about 25 weight percent and causing the polyurethane polymer to coagulate during the spraying. A film of the desired air and water vapor permeability is layed down by the practice of this process.

Suitable solvents useful in the practice of this invention will vary somewhat with the selection of the particular polymer to be used since the chosen solvent must dissolve the particular polymer being used. In general, however, water miscible and/or lower alcohol miscible ethers, and particularly cyclic ethers and acetone, have been found to be eminently suited to use in the practice of this invention. In addition, certain nonwater miscible substances, such as ketones, chlorinated hydrocarbons, esters and aromatic hydrocarbons, can be used with certain polymers which are soluble therein.

The nonsolvent or coagulating agent is suitably water or a lower aliphatic alcohol. Suitable alcohols include methanol, ethanol, iso- and normal propanol, butanols and hexanols. The alcohol is preferably monohydric. As noted above, care must be exercised in the selection of the combination of polymer-solvent-nonsolvent system to produce a system in which the solubility of the polymer changes rather sharply with a small change in the relative proportions of the solvent and nonsolvent. There may be used nonwater miscible liquids like chlorinated hydrocarbons in combination with alcohols or water miscible liquids in combination with either water and/or alcohols.

The preferred solvents in the practice of this invention are tetrahydrofuran, lower ketones, such as methyl ethyl ketone, and acetone and trichloroethylene.

It has been found to be practical in some situations to utilize a noncross-linked or partially cross-linked polyurethane prepolymer in the practice of this invention and to add to the spraying system a cross-linking agent for the polyurethane such that a mixture of polyurethane and cross-linking agent is deposited upon by spraying upon the substrate. The deposit can then be subjected to cross-linking conditions, e.g., high temperature, to form an insoluble, infusible coating having the desired permeability properties.

It is within the spirit and scope of this invention to provide copolymers or polymeric mixtures of the desired elastomeric polymer with other materials which are compatible with the elastomer. For example, up to 30%, preferably up to 20% by weight of a suspension of polyvinyl chloride can be mixed with a polyurethane polymer solution suitable for spraying according to this invention.

It has been found that the spraying solution should have a Brookfield viscosity at 20° C. of about 10 to 100 centipoise, preferably 15 to 80 centipoise in order to obtain a spray of the best physical characteristics for use in this invention.

It has been found to be best to dissolve the desired polymer in the selected solvent and then to add to this solution the selected nonsolvent or coagulating agent, preferably as a solution itself in the solvent or in some third material which is miscible with the solvent and does not exert a coagulating effect upon the dissolved polymer. For example, polyurethane polymer may be dissolved in tetrahydrofuran and a solution of water or alcohol in acetone dissolved in the polymer containing solution.

If desired, other materials can be added to the solution of the polymer and coagulating agent, e.g., dyes, pigments, fillers, emulsifiers, water repellents, antioxidants, higher boiling solvents and/or lubricants or plasticizers.

When coatings are made, or films are formed according to this invention, it has been found to be acceptable to use substantially any commercial type of spray gun and to operate such spray gun such that a very fine spray results. Air pressure should be such that the spray is still moist when it impinges upon the substrate intended to be coated. Air pressures of about 2½ to 4 atmospheres have been found to be suitable but this invention is in no way limited to particular spraying air pressures since in fact pressures as low as 1½ atmospheres have been used with success as well as spray via a simple discharge gun without a separate pressure vessel.

In fact, it is possible to apply the desired coating to the substrate by means of dipping with subsequent partial solvent evaporation to cause coagulation of the desired polymer on the substrate. Further, a varnishing roller may be used to produce relatively thick films.

Where a spray system is used, it is not particularly critical how far the point of spraying is from the substrate being coated. A spraying distance of about 15 to 35 cm. has been found to be best however, and is recommended.

The appearance and nature of the coating or the film produced according to this invention is determined to a great extent by the nature of the nonsolvent (coagulating agent) employed. Thus when lower alkanols are used as nonsolvents, compact, smooth, water vapor permeable coatings are produced (water vapor permeability of 5 mg./sq. cm./hr.). When water is used as the nonsolvent (coagulating agent) looser coatings having good stability and higher water vapor permeability are provided. Where n-hexane is the nonsolvent (coagulating agent), the film or coating produced is quite smooth, but the water permeability is quite low (for the same film thickness in the test data given above 0.3 mg./sq. cm./hr.). Similarly with toluene as the coagulant, a smooth, transparent film is produced which is practically impermeable to water vapor.

Considering the various coagulating agents which are known or can be determined for a polymeric system according to this invention, it would seem that there should be a correlation between suitability for use herein and the agent's effectiveness as a coagulant. But this has not been found to be possible. Thus, for example, n-hexane which will coagulate a polyurethane solution in tetrahydrofuran at a concentration of 5.5 percent by weight and toluene which will coagulate a polyurethane solution in tetrahydrofuran at a concentration of 40 percent by weight both result in polyurethane films or coatings which have little or no permeability to air and water vapor. On the other hand, water will cause coagulation of the same polymer from the same solvent at 8 percent by weight and isopropanol will cause coagulation of the same polymer from the same solvent at 20 percent by weight to produce a film or coating which is extremely desirable from the point of view of water vapor and air permeability. Thus, it is not predictable from solubility and coagulation data which precipitants will result in a film or coating product which is desirable, within the terms of this invention, for use as a leather substitute. It could not be predicted that only polar coagulants would produce materials having good air and water vapor permeability.

The following examples are illustrative of the instant invention and are by no means determinative of or restrictive upon the scope thereof.

The following Examples A and B are intended to show operative processes which do not produce products desirable for use as leather substitutes, particularly such materials which are suited to use for shoe uppers.

EXAMPLE A

A polyurethane was prepared in known manner from 0.2 mol of adipic acid gloycol ester, 0.21 mol of 1,4-butane diol and 0.411 mol of diphenyl methane diisocyanate and dissolved to a 10 percent by weight solution in tetrahydrofuran. A mixture of n-hexane and tetrahydrofuran in a ratio of 3:2 parts be weight was added to the polymer solution with continuing agitation to a concentration of about 9 percent by weight (a 10-percent concentration will cause precipitation). The solution has a viscosity at 20° C. of about 70 cp. (Brookfield). It was sprayed by a spray gun with a two-finger trigger and jet regulating valve, a nozzle width of 1.4 mm. and an air consumption of 410 l./min. at an atomization air pressure of 3.5 atmospheres gauge (JGA gun, air cap 704, nozzle FF of the Divilbiss Co.) from a galvanized pressure vessel with an insert contained and a built-in agitator (pressure vessel 0M2, Divilbiss) with a pressure of 1.5 atmospheres gauge onto a needled polyamide non-woven fabric of a density of 0.4 gm./cc. impregnated with polyurethane in a ratio of 1:1. The spraying distance was 20 cm. The solution arrived on the web while still moist. The coating was transparent and homogeneous. After about 8 to 12 crossings, the initially rough surface of the web had become smooth; the coating thickness was 0.35 mm. The water vapor permeability, measured by the method of Mitton, was less than 0.3 mg./cm.$^2$/hr.

EXAMPLE B

Test A was repeated under the same conditions, except that instead of using a mixture of hexane/THF, pure toluene was used, to which in this case, 12% solution of the polymers was added. About 36.5% toluene was added, since above 38% toluene coagulation commences. The solution behaved similar to Example A. The coating —about 0.35 mm. thick—was smooth, transparent and practically impermeable to water vapor.

The following examples illustrate the practice of this invention while in no way limiting the scope thereof.

EXAMPLE 1

100 parts of the polyurethane solution described in Example A was dissolved in tetrahydrofuran to which solution was added 23.5 parts of a mixture of 2 parts of isopropanol, 3 parts of water and 2 parts of tetrahydrofuran, somwhat less than necessary for incipient coagulation (24.5%). The viscosity of the solution was about 70 cp. This solution was sprayed under the conditions described in Example A onto a needled polyamide non-woven web of a density of 0.4 gm./cc. which was impregnated in a ratio of 1:1 with a polyurethane. The solution was coated onto the web while still moist to produce a coating which was cloudy. After about 10 crossings (thickness 0.3 mm.), the initially rough surface of the nonwoven fabric had become smooth. Furthermore, there was the additional advantage that the formation of "rolls," which occurs upon the stretching of the non-woven fabric by the needle bed was no longer observed. The permeability to water vapor determined by the method of Mitton was 5 mg./cm.$^2$/hr., the coated web could be folded 200,000 times in a Bally Flexometer without damage. Upon the spraying of an ordinary high-gloss varnish [based upon polyurethane, polymethyl methacrylate copolymer and polyamide (for instance, Baygen varnish manufactured of Bayer-Leverkusen)] in a thickness of 10$\mu$, the permeability to water vapor dropped to 3 mg./cm.$^2$/hr.

EXAMPLE 2

Under the experimental conditions described in Example 1, a solution of 9 parts of the polyester urethane described above and one part of suspension polyvinylchloride having a K value of 70 were dissolved in 90 parts of tetrahydrofuran. In addition, 0.4 part of microlith black C—K[R] (Ciba), and a 50% dispersion of carbon black pigment in a vinyl copolymer, were stirred into the solution and were dispersed in the course of 10 minutes. This solution was thereupon treated with 18.5 parts of a 1:8 mixture of water and propanol; this is somewhat less than would be necessary for incipient coagulation (about 19.5 parts). This solution was sprayed under the above recited conditions onto a needled nonwoven polyamide fiber fabric impregnated with a 1:1 carboxylated butadiene acrylonitrile copolymer, the original rough surface being completely smooth after 12 crossings and the formation of billets otherwise observed upon the stretching of the nonwoven fabric also being eliminated. The thickness of the coating was 0.35 mm. The permeability to water vapor was somewhat less than in Example 1 and amounts to 4.2 mg./cm.$^2$/hr. as determined by the method of Mitton. After spraying the finish described in Example 1 in a thickness of 7 to 8$\mu$ the water vapor permeability was 2.6 mg./cm.$^2$/hr. The other properties correspond to those indicated in Example 1.

EXAMPLE 3

9 parts of polyether urethane prepared from 300 g. of polytetramethylene glycol ether, 42 g. of butylene glycol, 31.2 g. of polyethylene glycol of a molecular weight of 400, and 120.6 g. of a 65:35 mixture of 1,4- and 1,6-toluene diisocyanate and 1 part of suspension polyvinyl chloride with a K value of 70 were dissolved in tetrahydrofuran. To this solution, there was added 15 parts of a 1:4 mixture of water and isopropanol, somewhat less than would be necessary for incipient coagulation. The solution was sprayed under the experimental conditions described onto a polyurethane 1:1 impregnated, needled, nonwoven polyamide fabric. 14 crossings were necessary until the coated nonwoven fabric was smooth (0.4 mm.). The nonwoven fabric no longer showed any formation of billets upon stretching. The permeability to water vapor determined by the method of Mitton was 4.6 mg./cm.$^2$/hr.; 200,000 foldings were experienced without damage in the Bally Flexometer.

EXAMPLE 4

1 part of a copolymer of ethyl acrylateacrylonitrile methacrylic acid 80–16–4 (specific viscosity 0.45 in 0.1% solution in acetone) and 9 parts of acetone were treated with 2.5 parts of a 1:1:2 mixture of acetone, isopropanol and water. Thereupon, 5%—referred to polymer—of a modified zinc oxide (Goodrite 3300[R]) dispersed in acetone was added. The solution was sprayed under the experimental conditions described above onto a nonwoven polyamide fiber fabric impregnated in a ratio of 1:1 with a carboxylated butadiene-acrylonitrile methacrylic acid latex, about 11 crossings being necessary in order to obtain complete smoothness of the nonwoven fabric (thickness about 0.3 to 0.35 mm.). After brief drying at room temperature, the coated nonwoven fabric was heated for 3 minutes at 150° C. The permeability to water vapor determined by the method of Mitton was 4.2 mg./cm.$^2$/hr.

EXAMPLE 5

1 part of chlorosulfonated polyethylene was dissolved in 9 parts of methyl ethyl ketone and thereupon 0.8 part of a 1:2:2 mixture of acetone, water and n-isopropanol was added. This solution was sprayed onto the smooth side of a unilaterally roughened cotton twill having a weight of 500 grams per square meter. After about 8 crossings and with a layer thickness of 0.25 mm., the coating was smooth. The permeability to water vapor was 5.2 mg./cm.$^2$/hr. without Baygen varnish finish, and 3.1 mg./cm.$^2$/hr. with an 8$\mu$ Baygen varnish finish. 200,000 foldings were withstood in the Bally Flexometer test. The coated fabric had good abrasion resistance.

Water vapor permeability was measured for purposes of this invention in accord with the physical measuring methods for leather IUP–15.

Flexural strength was measured for purposes of this invention in acord with the physical measuring methods for leather IUP–20.

The torsion modulus of polymers useful in this invention was measured by the torsional vibration test DIN 53445.

The film of this invention may be self-supporting or it may be in the form of a coating on a suitable substrate. Such substrates may be fabrics, woven or nonwoven or other porous materials, the fibers used to produce the fabric referred to are suitably of natural or synthetic origin, for example, polyester, polyamide cellulosic ester, cotton, acrylic, etc.

What is claimed is:

1. A method of producing a film of polymeric material which is permeable to water vapor and to air, but is relatively impervious to liquid water, which comprises dissolving a polymer having a torsion modulus of at least about 30 kg./sq. cm. in a solvent for said polymer; adding to said solution at least one coagulant selected from the group consisting of water and a lower alkanol substantially miscible with said solvent in a proportion of about one half of to slightly less than the minimum proportion which will cause coagulation (precipitation) of said polymer, said solvent having a higher vapor pressure than said coagulant; spraying said solution on a substrate during which spraying a portion of said solvent evaporates whereby the proportion of said coagulant is increased to greater than the minimum coagulating proportion whereby said polymer coagulates into said film.

2. The method claimed in claim 1, wherein said film adheres to said substrate whereby forming a coating thereon.

3. The method claimed in claim 1, wherein said film is self-supporting.

4. The method claimed in claim 1, wherein said polymer is selected from the group consisting of polyurethanes, acrylic moiety polymers, halogenated sulfonated polyolefins and mixtures thereof.

5. The method claimed in claim 1, wherein said solvent is selected from the group consisting of cyclic ethers and lower ketones.

6. The method claimed in claim 1, wherein said coagulating agent is a mixture of water and a lower alkanol.

7. The method claimed in claim 1, wherein said coagulant is added as a solution in said solvent.

8. The method claimed in claim 1, wherein said polymer is a polyurethane having a torsion modulus of at least about 40 kg./sq. cm., said solvent is tetrahydrofuran and said coagulant is a mixture of water and isopropanol.

9. The method claimed in claim 1, wherein the solvent is a chlorinated hydrocarbon and the coagulant is an alcohol.

10. The method claimed in claim 8, wherein the substrate upon which said solution is sprayed is a non-woven synthetic fiber web.

11. The method claimed in claim 8, wherein said polyurethane is an isocyanato-terminated prepolymer and wherein said prepolymer is cross-linked after coagulation thereof.

References Cited

UNITED STATES PATENTS 3,100,721 8/1963 Holden ---------- 117—135.5
3,232,819 2/1966 Satas ------------ 117—104X WILLIAM D. MARTIN, Primary Examiner T. G. DAVIS, Assistant Examiner U.S. Cl. X.R.

117—135.5, 138.8, 140, 161